United States Patent
Zhang et al.

(10) Patent No.: US 10,521,144 B2
(45) Date of Patent: Dec. 31, 2019

(54) DATA BLOCK STORAGE BY SPLITTING FILE CONTENT AND FILE HEADERS FOR INDEPENDENT STORAGE

(71) Applicant: Beijing Gupanchuangshi Science and Technology Development Co., Ltd., Beijing (CN)

(72) Inventors: Haiying Zhang, Beijing (CN); Haiyan Zhou, Beijing (CN)

(73) Assignee: Beijing Gupanchuangshi Science and Technology Development Co., Ltd., Beijing (CN)

( * ) Notice: Subject to any disclaimer, the term of this patent is extended or adjusted under 35 U.S.C. 154(b) by 392 days.

(21) Appl. No.: 15/515,125

(22) PCT Filed: Sep. 28, 2015

(86) PCT No.: PCT/CN2015/090993
§ 371 (c)(1),
(2) Date: Mar. 28, 2017

(87) PCT Pub. No.: WO2016/045641
PCT Pub. Date: Mar. 31, 2016

(65) Prior Publication Data
US 2017/0242620 A1    Aug. 24, 2017

(30) Foreign Application Priority Data

Sep. 28, 2014   (CN) .......................... 2014 1 0510613

(51) Int. Cl.
*G06F 3/06*   (2006.01)

(52) U.S. Cl.
CPC .......... *G06F 3/0644* (2013.01); *G06F 3/0604* (2013.01); *G06F 3/064* (2013.01);
(Continued)

(58) Field of Classification Search
CPC ..................................................... G06F 3/0644
(Continued)

(56) References Cited

U.S. PATENT DOCUMENTS

| 2007/0025626 | A1* | 2/2007 | Birinov | H04N 19/50 |
| | | | | 382/238 |
| 2012/0136960 | A1* | 5/2012 | Liu | G06F 16/1752 |
| | | | | 709/217 |

(Continued)

FOREIGN PATENT DOCUMENTS

| CN | 1641603 A | | 7/2005 |
| CN | 101231653 A | * | 7/2008 |
| CN | 101231653 A | | 7/2008 |

OTHER PUBLICATIONS

International Search Report, International Application No. PCT/CN2015/090993, 6 pages, dated Dec. 31, 2015.

*Primary Examiner* — Pierre M Vital
*Assistant Examiner* — Andrew N Ho
(74) *Attorney, Agent, or Firm* — Klarquist Sparkman, LLP (57) ABSTRACT

Provided are a data block storage method, a data query method and a data modification method. The data block storage method splits file content of a data block to be stored, to generate at least two pieces of file content of the split data block. The file content of the data block to be split comprises at least one character set which is the smallest unit of the file content indicating the meaning of the data block to be split, the character set comprises a plurality of characters, each piece of file content of the split data block comprises a portion of the characters of the same character set. Even if another person obtains a portion of the data content after splitting, it would not be possible to parse effective content;
(Continued)

and the split file content is stored in at least two independent storage systems, improving data security.

16 Claims, 1 Drawing Sheet

(52) U.S. Cl.
CPC .......... *G06F 3/0623* (2013.01); *G06F 3/0643* (2013.01); *G06F 3/0683* (2013.01)

(58) Field of Classification Search
USPC ........................................................ 707/827
See application file for complete search history.

(56) References Cited

U.S. PATENT DOCUMENTS

| | | | | |
|---|---|---|---|---|
| 2013/0185266 A1* | 7/2013 | Horn | ..................... | G06F 16/113 707/691 |
| 2014/0108796 A1* | 4/2014 | Johnson | .............. | G06F 21/6272 713/167 |

* cited by examiner

DATA BLOCK STORAGE BY SPLITTING FILE CONTENT AND FILE HEADERS FOR INDEPENDENT STORAGE

CROSS REFERENCE TO RELATED APPLICATIONS

This is the U.S. National Stage of International Application No. PCT/CN2015/090993, filed Sep. 28, 2015, which was published in Chinese under PCT Article 21(2), which in turn claims the benefit of China Application No. 201410510613.X, filed Sep. 28, 2014.

TECHNICAL FIELD

The present invention relates to the field of data control, and particularly to a data block storage method, a data query method and a data modification method.

BACKGROUND ART

With continuous development of internet technologies, at present, products based on various cloud architectures emerge one after another. A carrier of cloud storage technologies is a cloud system. Specifically, the cloud system includes a public cloud and a private cloud. The private cloud is safe, but is not easy to be called on a large scale. The safety of the public cloud seems to be somewhat poor from both an actual application view and a psychological point of view, however, various computing resources, storage resources and bandwidth resources of the public cloud are much better. Therefore, many users are in a dilemma of facing security problems while storing their data in a public network.

For example, nowadays, a lot of data, such as audios, videos, texts, e-mails and pictures, are private data of individuals or public institutions. If such data are only stored at one service provider, no matter how the provider provide encryption, users will always consider that the data are out of their own control, which will make the users feel unsafe. Currently, the main technology used in the world encrypts, with its own encryption means, the users' data to be saved, and then stores such data.

It can be predicted that desired plain text can be acquired from data stored in a cloud system or other storage systems, by acquiring an encryption password or reversely calculating a decryption password with a Maxotek Breaker Ultimate, so as to directly read the plain text. A data block is used as a main carrier of data. If file content of the data block is maliciously acquired, it is prone to leaks. Thus, there is a need for a method to solve the security problem of the data block in a cloud storage environment.

Disclosure of the Invention

An object of the present invention is to provide a data block storage method, a data query method and a data modification method, so as to solve the above problems.

An embodiment of the present invention provides a data block storage method, which includes:
acquiring a data block to be split, the data block to be split including file content indicating actual meaning of the data block to be split;
splitting the file content of the data block to be split according to a preset first splitting rule, so as to generate at least two pieces of split file content of the data block, where the file content of the data block to be split includes at least one character set, the character set is a smallest unit of the file content that is used for indicating meaning of the data block to be split, and the character set includes a plurality of characters, each of the pieces of split file content of the data block includes a portion of the characters of a same character set; and
storing, according to a preset first storage position, different ones of the pieces of split file content of the data block into at least two independent storage systems, respectively.

Preferably, the data block storage method as provided by the embodiment of the present invention further includes:
dividing, according to a preset dividing mode, the data block to be split into a plurality of sub data blocks to be split, so that file content of each of the sub data blocks to be split is exactly identical with a portion of continuous file content of the data block to be split;
where the step of splitting the file content of the data block to be split according to a preset first splitting rule includes:
splitting, according to a data block splitting rule, the file content of each of the sub data blocks to be split, so as to generate a plurality of split data blocks.

Preferably, the data block to be split further includes a file header indicating a file structure of the data block to be split;
after the data block to be split is acquired, the data block storage method further includes: splitting, according to a preset second splitting rule, the file header of the data block to be split so as to generate at least two split file headers of the data block, where the file header of the data block to be split includes at least one character set, the character set is a smallest unit of the file header that is used for indicating the file structure of the data block to be split, and the character set includes a plurality of characters, each of the split file headers of the data block includes a portion of the characters of a same character set, or each of the split file headers of the data block includes a portion of the character sets of the file header of the data block to be split; and
storing, according to a preset first storage position, different ones of the split file headers of the data block into at least two independent storage systems, respectively.

Preferably, the step of splitting, according to a preset second splitting rule, the file header of the data block to be split so as to generate at least two split file headers of the data block includes:
acquiring from the file header a structure coding indicating the file structure and an index table of the file content, where the structure coding is configured to form a framework of the file content, so that the file content can be filled according to the framework, so as to form a file in a form capable of being directly displayed;
splitting, according to a preset third splitting rule, the structure coding and the index table, respectively, so as to generate a plurality of zone file structure codings and a plurality of zone file index tables corresponding to the individual zone file structure codings, where each of the zone file structure codings and each of the zone file index tables both correspond to one of the sub data blocks to be split, and each of the zone file structure codings and the corresponding sub data block to be split can be combined into an integral file capable of being directly displayed, and each of the zone file index tables carries file content index information of one designated sub data block to be split; and splitting, according to a preset fourth splitting rule, a code of each of the zone file structure codings and a code of each of the zone file index tables, respectively, so as to form a plurality of sub zone file structure codings and a plurality of sub zone file index tables, so that each of the sub zone file structure codings is unable to display content of the zone file structure coding corresponding thereto, and that each of the sub zone file index tables is unable to display content of the zone file index table corresponding thereto, and the plurality of sub zone file structure codings and the plurality of sub zone file index tables are respectively carried in at least two of the split file headers of the data block.

Preferably, if the character set of the file content of the data block to be split only includes character strings with a fixed length, and total number of the characters in the character set of the file content of the data block to be split can be exactly divided by Y, where Y is a constant value, the character strings with the fixed length in the file content of the data block to be split are split successively, according to number X of groups and a splitting length Y carried in the first splitting rule, so as to generate X pieces of split file content of the data block, with each of the pieces of split file content of the data block including one or more character strings with the length Y.

Preferably, the splitting, according to number X of groups and a splitting length Y carried in the first splitting rule, the character strings with the fixed length in the character set of the file content includes:
  splitting, according to a sequential order of arrangement, all the characters of the file content of the data block to be split into a plurality of groups of first character clusters with the length Y; and then successively assigning, according to a sequential order of the first character clusters, the plurality of the first character clusters to the X pieces of split file content of the data block.

Preferably, if the character set of the file content of the data block to be split only includes character strings with a fixed length, and total number of the characters in the character set of the file content of the data block to be split cannot be exactly divided by Y, where Y is a constant value, the character set of the file content of the data block to be split is filled with filling digits, so that the total number of the characters in the filled character set of the file content of the data block to be split can be exactly divided by Y; and
  the character strings with the fixed length in the file content of the data block to be split is split according to number X of groups and a splitting length Y carried in the first splitting rule, so as to generate X pieces of split file content of the data block, with each of the pieces of split file content of the data block including one or more character strings with the length Y.

Preferably, if the character set of the file content of the data block to be split only includes character strings with a fixed length, and total number of the characters in the character set of the file content of the data block to be split cannot be exactly divided by Y, where Y as a splitting length is a variable, then all the characters of the file content of the data block to be split are successively split, according to a sequential order of arrangement, into a plurality of groups of second character clusters with a length changing based on Y; and
  the individual groups of second character clusters are successively assigned to X pieces of split file content of the data block, according to a sequential order of the second character clusters.

Preferably, the successively splitting the characters of the file content of the data block to be split into a plurality of groups of second character clusters with a length changing based on Y includes:
  continuously splitting, according to one varied value of Y, the characters of the file content of the data block to be split, to obtain X groups of character clusters with a same character length.

Preferably, the data block storage method further includes: randomly acquiring a plurality of function values;
  performing function operation on each of the function values so as to generate a plurality of values to be used, where the function operation includes trigonometric function operation and exponential and logarithmic function operation; and
  performing rounding operation on each of the values to be used, so as to determine the variable Y.

Preferably, if the character set of the file content of the data block to be split further includes character strings with a varied length, the character strings with the varied length and the character strings with the fixed length in the character set of the file content of the data block to be split are separated into two groups of character strings;
  if the total number of the characters in the group of character strings with the fixed length can be exactly divided by the splitting length Y, the character strings with the fixed length of the file content of the data block to be split are split according to number X of groups and the splitting length Y carried in the first splitting rule, so as to generate X pieces of split file content of the data block, with each of the pieces of split file content of the data block including one or more character strings with the length Y; and
  a character length of the group of character strings with the varied length is determined, and splitting is performed according to the character length, so as to generate a plurality of groups of split character strings with the varied length, and the plurality of groups of split character strings with the varied length are sequentially assigned to the X pieces of split file content of the data block.

Preferably, if the data block to be split is in a text format, the combining each of the zone file structure codings and the corresponding sub data block to be split into an integral file capable of being directly displayed, includes: combining each of the zone file structure codings and the corresponding sub data block to be split into a continuous text segment with a designated number of characters;
  if the data block to be split is in a video format, the combining each of the zone file structure codings and the corresponding sub data block to be split into an integral file capable of being directly displayed, includes: combining each of the zone file structure codings and the corresponding sub data block to be split into a continuous video image with a designated time duration;
  if the data block to be split is in an audio format, the combining each of the zone file structure codings and the corresponding sub data block to be split into an integral file capable of being directly displayed, includes: combining each of the zone file structure codings and the corresponding sub data block to be split into continuous audio data with a designated time duration; or
  if the data block to be split is in an image format, the combining each of the zone file structure codings and the corresponding sub data block to be split into an integral file capable of being directly displayed, includes: combining each of the zone file structure codings and the corresponding sub data block to be split into a designated continuous image.

Preferably, the step of storing, according to a preset first storage position, different ones of the pieces of split file content of the data block into at least two independent storage systems, respectively, includes:

storing the plurality of pieces of split file content of the data block into different public storage systems and/or private storage systems, according to a predetermined storage proportion.

Preferably, the step of storing, according to a preset first storage position, different ones of the split file headers of the data block into at least two independent storage systems, respectively, includes:

storing the plurality of split file headers of the data block into different public storage systems and/or private storage systems, according to a predetermined storage proportion, with storage positions of the split file headers of the data block being different from storage positions of the pieces of split file content of the data block.

An embodiment of the present invention further provides a data query method, including the data block storage method, where the data query method further includes:

acquiring a file content keyword;

querying the independent storage system for file content of a plurality of split data blocks corresponding to the file content keyword; and combining, according to the preset first splitting rule, the file content of the plurality of split data blocks into file content of a data block to be split, or a portion of file content of a data block to be split.

Preferably, the data query method, as further provided by the embodiment of the present invention, further includes: querying a cloud system for file headers of a plurality of split data blocks including the file header keyword;

querying a cloud system for a plurality of file headers, including the file header keyword, of the split data blocks;

combining, according to a preset second splitting rule, the file headers of the plurality of split data blocks into a file header of the data block to be split; and combining the file content of the data block to be split or the portion of the file content of the data block to be split and the file header of the data block to be split into the data block to be split or a portion of the data block to be split.

Preferably, the file header includes a structure coding indicating a file structure and an index table of the file content, the structure coding is configured to form a framework of the file content, so that the file content can be filled according to the framework, so as to form a file in a form capable of being directly displayed;

the step of combining, according to a preset second splitting rule, the file headers of the plurality of split data blocks into a file header of the data block to be split includes:

acquiring a plurality of zone file structure codings and a plurality of zone file index tables of the plurality of split data blocks; and combining, according to a preset third splitting rule, the plurality of zone file structure codings and the plurality of zone file index tables, respectively, so as to form the file header of the data block to be split.

Preferably, the data query method, as further provided by the embodiment of the present invention, further includes: acquiring an implicit data code, where the implicit data code is configured to identify an implicit file in the data block;

splitting the implicit data code according to a preset splitting rule for implicit data code, so as to obtain at least two split implicit data codes;

querying a cloud system for file content of a plurality of split data blocks including the implicit data code; and combining, according to the preset first splitting rule, the file content of the split data blocks corresponding to the plurality of split implicit data codes into the file content of the data block to be split or a portion of the file content of the data block to be split.

An embodiment of the present invention additionally provides a data modification method, including the data block storage method, where the data modification method further includes:

acquiring a character string to be written, a write position and a write mode, where the write mode includes deletion, addition and replacement;

searching, according to the write position and a first storage position acquired in advance, the independent storage system for a data block to be modified, where the first storage position includes a storage address of the file content of each of split data blocks; and deleting, according to the write position and the first splitting rule, a character corresponding to the write position in the data block to be modified, if the write mode is embodied as deletion, so as to generate file content of the modified data block; or splitting the character string to be written according to the first splitting rule, if the write mode is embodied as addition or replacement, so as to generate a character to be written; and deleting a character corresponding to the write position in the file content of the split data block, and adding, according to the write position, the character to be written to file content of a new data block to be modified, so as to generate file content of a plurality of modified data blocks.

As described above, in the prior art, since the data is stored only through encryption, another person may obtain a decryption password through reverse cracking, so as to acquire the original data to be stored, thereby causing the data to be in an insecure state. However, different from the prior art, with the data block storage method provided by the embodiments of the present invention, the file content of the data block to be stored is split so as to generate at least two pieces of split file content of the data block, where the file content of the data block to be split includes at least one character set, the character set is the smallest unit of the file content that is used for indicating the meaning of the data block to be split, and the character set includes a plurality of characters, and each of the pieces of split file content of the data block includes a portion of the characters of a same character set. That is, the smallest unit for indicating the meaning of the data block is split. In this way, even if another person obtains a portion of the data content after the splitting, it would be not possible to parse effective content. Moreover, by storing the split file content in at least two independent storage systems, the data security is further improved. Therefore, the deficiencies in the prior art are overcome.

DETAILED DESCRIPTION OF EMBODIMENTS

Below, the present invention is further described in detail by means of specific embodiments in conjunction with figures.

Figure 1:
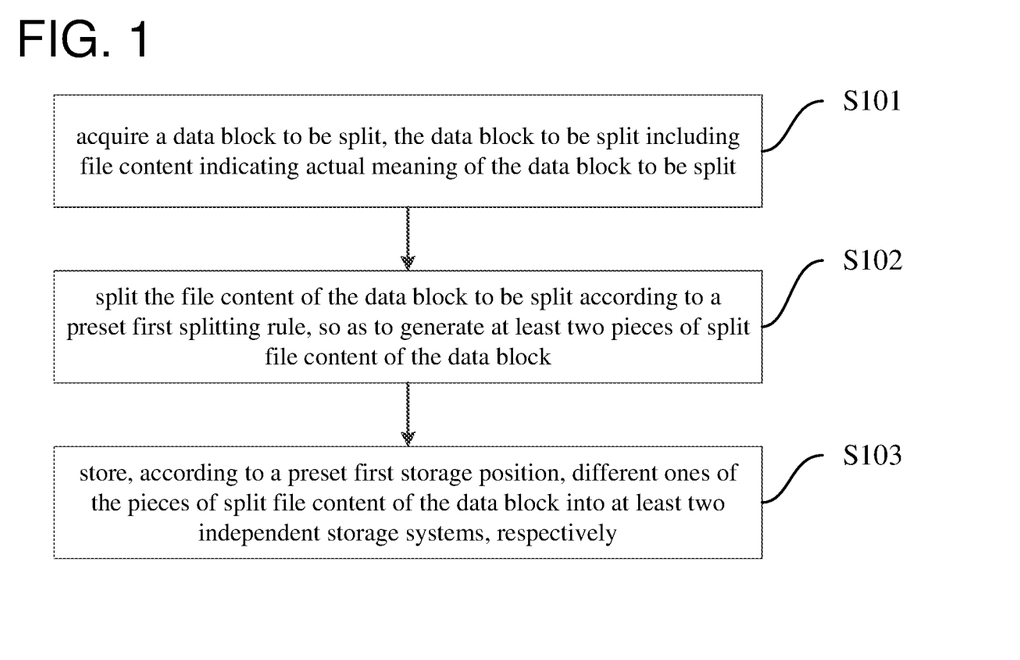
FIG. 1 shows a basic flow chart of a data block storage method of an embodiment of the present invention.

Embodiment 1 of the present invention provides a data block storage method. As shown in FIG. 1, the data block storage method includes steps as follows:

S101, acquiring a data block to be split, the data block to be split including file content indicating actual meaning of the data block to be split;

S102, splitting the file content of the data block to be split according to a preset first splitting rule, so as to generate at least two pieces of split file content of the data block (file content of at least two split data blocks); and S103, storing, according to a preset first storage position, different ones of the pieces of split file content of the data block into at least two independent storage systems, respectively.

In Step S101, the data block refers to several groups of records sequentially arranged together, and is one data unit for being transmitted between a main storage and an input device, an output device or an external storage. The data block consists of two parts which are a file header and file content, respectively. The file header carries content of a data architecture, while the file content carries data content identifying actual meaning of the file. As for the data block used as a carrier of data, a general encryption technology adjusts file data in the data block to change an expression form of the data, so as to make it impossible for a person who reads the data to understand true meaning of the data, where the key factor of changing the expression form of the data is an encryption key, that is, the expression form of the data is changed by calculating the encryption key. However, for this manner of enhancing the data security through encryption (including symmetric encryption and asymmetric encryption), true data can generally be acquired by acquiring the key or by means of other mandatory reading methods, thereby causing the problem of leakage. In view of this, on the basis of properties of the data block, the file header and the file content may be respectively split and stored, so as to improve the security. Specifically, at first, the file content of the data block to be split needs to be acquired. The specific manner of acquiring the file content does not need to be defined. Certainly, in order to improve the security of processing, a designated terminal or cloud may be used to acquire the file content, and accordingly split the file content.

In Step S102, the file content of the data block to be split includes at least one character set. The character set is a smallest unit of the file content that is used for indicating meaning of the data block to be split, and the character set includes a plurality of characters. Each of the pieces of split file content of the data block includes a portion of the characters of a same character set. The character set is a set of codes which can represent or correspond to one interpretation unit conveying a specific meaning.

If the file content corresponds to written language, the meaning corresponding to the character set should be coding of the written language. For example, if the coding of a word "I (我)" is "11001110", the character set consists of 8 characters. Likewise, other file contents, such as audios, videos, graphics and e-mails, can be divided into such character sets. The character set also needs fixed coding. As a computer language, the smallest language unit thereof is 0 and 1 of the binary system, and therefore, the splitting of the character set (the number of the characters in one character set is variable) can make it impossible for the file content to indicate its original meaning. Common suffixes of a text file (the file content of which is written language) include PDF, DOC, TXT and WPS.

If the file content is audio, the meaning indicated by the character set is a sound at a certain time. If the sound is formed by simply synthesizing a plurality of tones, the piece of split file content corresponds to each single tone, that is, a character corresponding to each single tone needs to be split so that the split character cannot correspond to a certain sound. Common audio and video streaming media formats include for example asf, Advanced Streaming format. (Microsoft); rm, Real Video/Audio (Progressive Networks); ra, Real Audio (Progressive, Networks); swf, Shock Wave Flash (Macromedia); mov, QuickTime (Apple); viv, Vivo Movie (Vivo Software); mp4, (Motion Picture Experts Group); and mp3, (Motion Picture Experts Group).

If the file content is an image, the meaning indicated by the character set is a pixel code of a certain pixel point, or a set of pixel codes of several pixel points, and such several pixel points are unable to display a feature of the image when appearing together. The feature of the image refers to a set of color areas of the image which are capable of reflecting the meaning of the image, for example, a set of several pixel points. In this case, when these several pixel points are split, codes of these several pixel points may be split respectively (so that each pixel point cannot display its original color), or these several pixel points may also be integrally split (so as to generate a set of fully discrete pixel points), for example, these several pixel points may be spilt into several pixel points which are not adjacent to each other, so that even if these several pixel points can be restored, true meaning to be expressed by the image cannot still be obtained from these several pixel points. Certainly, after several discrete pixel points are obtained by the splitting, the code of each of the several discrete pixel points or codes of the several discrete pixel points may also be further split, so as to further improve the security.

If the file content is video, the meaning indicated by the character set is an image at a certain time, or individual pixel points of an image at a certain time. In this case, the video at a certain time is a relatively static picture (that is, one frame of image), and this relatively static picture may be regards as one image. Thus, an image of a certain picture may be split in a manner similar to that of splitting the image as described above. Certainly, for each of the written language, audio, image and video, the file content thereof may be split into two or more pieces of file content (the pieces of split file content of the data block) of written language. And the more the pieces of split file content of the data block, the better the security, and at the same time, the more difficult the assembling of the pieces of split file content, and the more the amount of calculations in the assembling.

After the file content is split, the file should be stored, i.e., Step S103 is performed. In order to improve the security of the file content, the pieces of split file content should be respectively stored into different independent storage systems, and certainly, the more discrete the storage, the better the security effect. For example, four pieces of split file content, A, B, C and D, may be respectively stored into A', B', C' and D', and in this case, even if someone can acquire one piece of split file content A from the storage system A', other pieces of split file content cannot be acquired from other storage systems, and therefore, this person cannot still know the true meaning to be expressed by the whole file content.

After the file is stored, there is a certain probability for a failure to happen on each of the storage systems. For example, if the storage system is invaded by viruses, the split file content cannot be acquired; for another example, if all the file content in the storage system is deleted or destroyed by an external force, the split file content cannot be acquired from outside. In view of this, when being stored, N pieces of split file content may be stored into N+1 independent storage systems, and moreover, the file content in any one of these independent storage systems can be found in other independent storage systems.

For example, after the splitting, five pieces of split file content (the split file content) of the data block, A, B, C, D and E, are obtained. If the original data block (the data block to be split) can be restored by combining any three pieces of split file content, at most two pieces of split file content can be stored in each of the storage systems, to prevent some storage system from possessing multiple pieces of split file content which are sufficient in amount to restore the data block to be split (the file content to be split). For example, the five pieces of split file content may be respectively stored in five storage systems in such a manner A and B may be stored in one storage system, B and C may be stored in one storage system, C and D may be stored in one storage system, D and E may be stored in one storage system, and E and A may be stored in one storage system. Certainly, three or four pieces of split file content may also be stored in each storage system. However, the more the pieces of split file content stored in a certain storage system, the poorer the security of the file, that is, a single storage system makes it easier to restore the data block to be split, which is unfavorable to the data security. Therefore, two to three pieces of file content may be stored in the independent storage system.

Furthermore, the data block storage method as provided by the embodiment of the present invention further includes steps as follows:

dividing, according to a preset dividing mode, the data block to be split into a plurality of sub data blocks to be split, so that file content of each of the sub data blocks to be split is exactly identical with a portion of continuous file content of the data block to be split.

In this case, Step S102 of splitting the file content of the data block to be split according to the first preset splitting rule includes:

splitting, according to a data block splitting rule, the file content of each of the sub data blocks to be split, so as to generate a plurality of split data blocks.

As for splitting the data block to be split so as to generate a plurality of sub data blocks to be split, the sub data block to be split may be split into a plurality of paragraphs, for example, one article may be split into multiple continuous paragraphs, or sentence clusters; one video or audio may be split into several videos or audios having continuity on time; and a picture may be split into several regions with continuous boundaries. In this way, when the splitting is to be performed at the next step, further splitting may be performed on this basis. If there is a need to modify the file, the split data blocks may be combined into a sub data block to be split. Since the sub data block to be split has continuous file content, a portion of data can be restored from this sub data block, and this portion of data has specific meaning; therefore, it only needs to modify this portion of data, and the workload of which is far less than that required in a case that all the split data blocks are combined into the data block to be split. Moreover, after all the split data blocks are stored in the cloud, if it is desired to modify the file content, there is no need to download all the split data blocks, but only a certain corresponding portion of the split data blocks needs to be downloaded, and then assembled and modified; alternatively, the corresponding portion of the split data blocks may also be firstly assembled, and then downloaded and modified. In this way, during transmission over the network, only a portion of the original data block (the data block to be split) is transmitted, which greatly reduces the amount of transmitted data and thus saves network resources.

Apart from splitting the file content, a file header may also be split, that is, the data block to be split also includes a file header indicating a file structure of the data block to be split.

In Step S101, after the data block to be split is acquired, the data block storage method further includes: splitting, according to a preset second splitting rule, the file header of the data block to be split so as to generate at least two split file headers of the data block, where the file header of the data block to be split includes at least one character set, the character set is a smallest unit of the file header that is used for indicating the file structure of the data block to be split, and the character set includes a plurality of characters, each of the split file headers of the data block includes a portion of the characters of a same character set, or each of the split file headers of the data block includes a portion of the character sets of the file header of the data block to be split; and storing, according to a preset first storage position, different ones of the split file headers of the data block into at least two independent storage systems, respectively.

The splitting of the file header may be performed in a manner similar to that of splitting the file content. The characters carried in the file header represent the file structure. Apart from being split and stored in a manner similar to that of splitting and storing the file content, the file header may also be split according to the character set, that is, the split file header may include a complete character set. That is to say, the file header to be split includes a plurality of character sets, and a complete file structure can be formed by combining all the character sets. Therefore, since the file header is split into a plurality of split file headers of the data block, and the split file header of the data block includes a portion of the character sets of the file header of the data block to be split, that is, the split file header of the data block includes a portion of file structure information having a specific meaning, and it is insufficient to display sufficient content by purely knowing such information, that is to say, no leakage will be caused. Moreover, the split file header may form a file structure corresponding to the sub data block to be split, so that partial file information (a certain section of an audio or video or a certain portion of an image) can be formed.

Furthermore, the splitting, according to a preset second splitting rule, the file header of the data block to be split so as to generate at least two split file headers of the data block includes steps as follows:

S104, acquiring from the file header a structure coding indicating the file structure and an index table of the file content, where the structure coding is configured to form a framework of the file content, so that the file content can be filled according to the framework, so as to form a file in a form capable of being directly displayed;

S105, splitting, according to a preset third splitting rule, the structure coding and the index table, respectively, so as to generate a plurality of zone file structure codings and a plurality of zone file index tables corresponding to the individual zone file structure codings, where each of the zone file structure codings and each of the zone file index tables both correspond to one of the sub data blocks to be split, and each of the zone file structure codings and the corresponding sub data block to be split can be combined into an integral file capable of being directly displayed, and each of the zone file index tables carries file content index information of one designated sub data block to be split;

S106, splitting, according to a preset fourth splitting rule, a code of each of the zone file structure codings and a code of each of the zone file index tables, respectively, so as to form a plurality of sub zone file structure codings and a plurality of sub zone file index tables, so that each of the sub zone file structure codings is unable to display content of the zone file structure coding corresponding thereto, and that each of the sub zone file index tables is unable to display content of the zone file index table corresponding thereto, and the plurality of sub zone file structure codings and the plurality of sub zone file index tables are respectively carried in at least two of the split file headers of the data block.

In Step S104, the structure coding and the index table of the file content are two types of content describing the file content. For example, the index table describes a position where designated file content appears, and the structure coding describes a presentation form of the file, such as table and array. That is to say, the structure coding and the index table are usually an indispensable portion of a file or a complex file, and the two in combination describe the architecture of the file.

In Step S105, corresponding to the splitting of the data block to be split into a plurality of sub data blocks to be split described in the preceding, here, the splitting of the structure coding into the zone file structure codings and the splitting of the index table into the zone file index tables both aim at cooperating with the sub data block to be split, so that the sub data block to be split can be restored into one integral file (that is, the sub data block to be split can be restored into a portion of one integral data block to be split, and this portion is continuous, for example, it may be a certain portion of a picture, a file of an audio or video at a certain period of time, a certain sentence or sentence cluster of written language).

In step S106, the zone file structure coding and the zone file index table, which are obtained after one splitting, should be split once more, so as to generate a plurality of sub zone file structure codings and a plurality of sub zone file index tables. Each of the sub zone file structure codings and each of the sub zone file index tables cannot indicate the true meaning, that is, even if one sub zone file structure coding or one sub zone file index table is read, the architecture system of the file cannot be known. In this step, the fourth splitting rule is directed against splitting the code of the file, that is, decomposing the code of one zone file structure coding or one zone file index table, thereby ensuring the security of the file structure.

At the time of storing the sub zone file structure coding and the sub zone file index table, they may be stored separately, so as to improve the security. Moreover, at the time of storing the pieces of split file content (the split file content), the sub zone file structure coding, the sub zone file index table and the pieces of split file content may also be stored separately from each other, so as to improve the security. The three are respectively retrieved when needed, so as to restore a portion of the data block (this portion of the data block can restore a piece of continuous file content). Certainly, in order to enhance the manageability of the data block, the file content restored from a portion of the data block may also be discontinuous, i.e., discrete.

Furthermore, if the character set of the file content of the data block to be split only includes character strings with a fixed length, and total number of the characters in the character set of the file content of the data block to be split can be exactly divided by Y, where Y is a constant value, the character strings with the fixed length in the file content of the data block to be split are split successively, according to the number X of groups and a splitting length Y carried in the first splitting rule, so as to generate X pieces of split file content of the data block, with each of the pieces of split file content of the data block including one or more character strings with the length Y.

Most character strings have a fixed length, that is, the length of the character string will not be changed as a storage position or a storage form changes. Therefore, by setting the splitting length Y, the number of parts with the length Y that would be split from all the characters may be determined. After the number X of groups and the splitting length Y are determined, targeted splitting may be performed. Specifically, all the characters may be firstly divided into a plurality of character clusters with the length Y, and then the individual character clusters may be successively placed into corresponding groups. For example, the individual character clusters may be labeled with identification numbers of 1-X, that is, the code of each of the character clusters is identified; and after the code of each of the character clusters is identified, each of the character clusters may be placed into a code group corresponding thereto. For example, several character sets are as follows: 01010010, 00001001, 01010100, 10100101, 01010101, 00101011, 01001010, 10011111, 00101001, 10100100, 01010010 and 01011001. Here, if X is 2 and Y is 8, the plurality of character clusters may be split into two groups:

X1=01010010, 01010100, 01010101, 01001010, 00101001, 01010010; and

X2=00001001, 10100101, 00101011, 10011111, 10100100, 01011001; and if X is 3 and Y is 16, they may be split into three groups:

X1=01010010, 00001001, 01001010, 10011111;
X2=01010100, 10100101, 00101001, 10100100;
X3=01010101, 00101011, 01010010, 01011001.

Likewise, X may be set as any digit smaller than the total number of the characters, Y may be set as a digit by which the total number of the characters can be exactly divided (for example, X=9, Y=2; X=5, Y=4). Certainly, in order to improve the confidentiality, it is better not to set Y as 1, or set it as a digit equal to the total number of the characters.

During identifying the character clusters, the identification may also be performed in any order. For example, the identification may be performed in an alternate mode, or odd and even bits may be identified differently, so as to improve the security.

During the splitting, the splitting, according to number X of groups and a splitting length Y carried in the first splitting rule, the character strings with the fixed length in the character set of the file content includes:

splitting, according to a sequential order of arrangement, all the characters of the file content of the data block to be split into a plurality of groups of first character clusters with the length Y; and then successively assigning, according to a sequential order of the first character clusters, the plurality of the first character clusters to the X pieces of split file content of the data block.

Apart from the case where the total number of the characters can be exactly divided by Y, there is also a case where the total number of the characters cannot be exactly divided by Y, which means, for specific calculation, that a remainder of dividing the total number of the characters by Y is not zero. In other words, it may be a situation as follows: if the character set of the file content of the data block to be split only includes character strings with a fixed length, and the total number of the characters in the character set of the file content of the data block to be split cannot be exactly divided by Y, where Y is a constant value, the character set of the file content of the data block to be split is filled with filling digits, so that the total number of the characters in the filled character set of the file content of the data block to be split can be exactly divided by Y; and the character strings with the fixed length in the file content of the data block to be split is split according to number X of groups and a splitting length Y carried in the first splitting rule, so as to generate X pieces of split file content of the data block, with each of the pieces of split file content of the data block including one or more character strings with the length Y.

That is to say, the characters in the character sets need to be firstly filled, so that the number of the characters after the filling can be exactly divided by Y, where the filling character may be a preset character not having an actual meaning.

If the character set of the file content of the data block to be split only includes character strings with a fixed length, and the total number of the characters in the character set of the file content of the data block to be split cannot be exactly divided by Y, where Y as a splitting length is a variable, then all the characters of the file content of the data block to be split are successively split, according to a sequential order of arrangement, into a plurality of groups of second character clusters with a length changing based on Y; and the individual groups of second character clusters are successively assigned to X pieces of split file content of the data block, according to a sequential order of the second character clusters.

That is to say, the value of Y is a varied value, and thus the lengths of the character clusters obtained through the splitting each time may be not the same. Therefore, when these character clusters are to be combined, a change rule of Y should also be known, thereby further improving the security.

Apart from splitting the character clusters in the sequential order, the character clusters may also be split in an alternative mode. For example, if the coding of a certain character is D4C6 4E91 E4 BA 91, this character string may be split in an order of its odd and even bits. For example, D4C6 is split into DC and 46, 4E91 is split into 49 and E1, and E4 BA 91 is split into EB9 and 4A1, where such splitting of the individual bits can also play a role in hiding the meaning corresponding to the original character. Furthermore, apart from the above splitting performed in the alternative mode, the splitting may also be performed in a predetermined order, for example, a leading character and a tailing character of each character string may be picked out. As for D4C6 4E91 E4 BA 91, the leading character and the tailing character picked out therefrom are D (leading character) and 1 (tailing character), and therefore, two combinations obtained by the splitting are D1 and 4C6 4E91 E4 BA 9. The splitting may also be performed according to a certain mathematical rule. For example, the splitting may be performed according to Fibonacci sequence, that is, digits in one character string at positions 1, 1, 2, 3, 5, 8, 13 and 21 are picked out, and other digits are left, so as to divide the original character string into two sub character strings. Such predetermined order may be a portion of an associated mode. For example, values of Y are 2, 4, 6, 8, 10 . . . , that is, the value of Y is increased by 2 each time, then character clusters 00001111, 00001111, 11110000, 1111000 may be divided into 00, 0011, 110000, 11111111, 0000111100, 00 . . . , so that the security of the data after the splitting can be improved in this way. Further, the successively splitting the characters of the file content of the data block to be split into a plurality of groups of second character clusters with a length changing based on Y, includes:

continuously splitting, according to one varied value of Y, the characters of the file content of the data block to be split, to obtain X groups of character clusters with a same character length.

On the basis of performing the splitting according to the varied values of Y, in order to ensure that the numbers of characters of the character clusters assigned to the individual groups are equal, the splitting may be continuously performed multiple times (X times) according to one varied value of Y. For example, as for 18 digits 123456789098765432, they may be split into 3 groups (X=3) according to Y=2, 1 and 3. In this case, the 18 digits are firstly divided into 9 groups, which are 12, 34, 56, 7, 8, 9, 098, 765, and 432, respectively, and then these groups of digits are respectively assigned to three groupings, i.e., X1=12, 7, 098; X2=34, 8, 765; X3=56, 9, 432. Such a splitting mode can ensure the numbers of characters in the individual obtained groupings are the same. That is to say, a same storage space is required for storing the characters of each grouping. Accordingly, the storage space may be more reasonably allocated, so as to improve the reading efficiency and storing efficiency, and improve the efficiency when updating is performed inside the computer.

It should be indicated that, in order to facilitate determination of the storage position of the data block, a same splitting mode may be applied to character strings indicating a same meaning; and in this way, the workload can be reduced, and it is also easy to combine the split data blocks.

Apart from generating a plurality of Y values in advance and taking the plurality of generated Y values as random variables, the varied value of Y may also be determined each time by function operation. For example, the data block storage method provided by the embodiment of the present invention further includes steps as follows:

randomly acquiring a plurality of function values;

performing function operation on each of the function values so as to generate a plurality of values to be used, where the function operation includes trigonometric function operation and exponential and logarithmic function operation; and performing rounding operation on each of the values to be used, so as to determine the variable Y.

The trigonometric function operation and the exponential and logarithmic function operations include, for example, Sin A=Y (A is greater than 0 degree and less than 90 degrees, and is not equal to 30 degrees), Cos A=Y (A is greater than 0 degree and less than 90 degrees, and is not equal to 60 degrees);

Tan A=Y (A is greater than 0 degree and less than 90 degrees, and is not equal to 45 degrees);

Log base A of C=Y (C is greater than 1, and is not equal to 1, and C cannot be a multiple of A);

In A=Y (A is not equal to 1 or e);

An n-th root of A=Y. Here, with these function operations, a result calculated from a digit may be a decimal number, and thus the decimal number needs to be rounded. Specifically, the rounding operation may be performed in a manner of rounded up, rounded down, or half adjust.

Apart from the character set in the fixed length, there is a character set in a varied length, for example, UTF-8. If the character set of the file content of the data block to be split further includes character strings with a varied length, the character strings with the varied length and the character strings with the fixed length in the character set of the file content of the data block to be split are separated into two groups of character strings;

if the total number of the characters in the group of character strings with the fixed length can be exactly divided by the splitting length Y, the character strings with the fixed length of the file content of the data block to be split are split according to number X of groups and the splitting length Y carried in the first splitting rule, so as to generate X pieces of split file content of the data block, with each of the pieces of split file content of the data block including one or more character strings with the length Y; and a character length of the group of character strings with the varied length is determined, and splitting is performed according to the character length, so as to generate a plurality of groups of split character strings with the varied length, and the plurality of groups of split character strings with the varied length are sequentially assigned to the X pieces of split file content of the data block.

If the character length of the group of character strings with the fixed length cannot be exactly divided by Y, characters may be added as described above, so that the length of the group of character strings can be add to a length capable of being exactly divided by Y, and then be further grouped.

Furthermore, if the data block to be split is in a text format, the combining each of the zone file structure codings and the corresponding sub data block to be split into an integral file capable of being directly displayed, includes: combining each of the zone file structure codings and the corresponding sub data block to be split into a continuous text segment with a designated number of characters.

If the data block to be split is in a video format, the combining each of the zone file structure codings and the corresponding sub data block to be split into an integral file capable of being directly displayed, includes: combining each of the zone file structure codings and the corresponding sub data block to be split into a continuous video image with a designated time duration.

If the data block to be split is in an audio format, the combining each of the zone file structure codings and the corresponding sub data block to be split into an integral file capable of being directly displayed, includes: combining each of the zone file structure codings and the corresponding sub data block to be split into continuous audio data with a designated time duration.

If the data block to be split is in an image format, the combining each of the zone file structure codings and the corresponding sub data block to be split into an integral file capable of being directly displayed, includes: combining each of the zone file structure codings and the corresponding sub data block to be split into a designated continuous image.

That is to say, each sub data block to be split has its fixed meaning, and can express certain content. In this case, if a user wants to modify the content of the data block, it is unnecessary to combine all of the split data blocks to restore the data block, but only a portion needs to be restored into the sub data block to be split, which greatly reduces the amount of data processing. Moreover, if the split data block is stored in a network database (cloud database), when a terminal wants to acquire the content stored in the cloud database, the terminal may also acquire only a small portion of the file content, and make modification thereto, which can greatly reduce the amount of data transmitted over the network while making sure that the modification meets the requirements.

Apart from splitting the data block, the security may also be improved by changing the storage position of the data block. The step of storing, according to a preset first storage position, different ones of the pieces of split file content of the data block into at least two independent storage systems, respectively, includes:

storing the plurality of pieces of split file content of the data block into different public storage systems and/or private storage systems, according to a predetermined storage proportion.

Storing the data into different storage systems also has an effect of improving the security. Different split data blocks may also be stored into different cloud systems, to further improve the security.

Furthermore, the step of storing, according to a preset first storage position, different ones of the pieces of split file content of the data block into at least two independent storage systems, respectively, includes:

storing the plurality of split file headers of the data block in different public storage systems and/or private storage systems, according to a predetermined storage proportion, with storage positions of the split file headers of the data block being different from storage positions of the pieces of split file content of the data block.

Moreover, it should be indicated that the private storage system has higher security but is less convenient to access, in contrast, the public storage system has lower security but is more convenient to access. Therefore, the storage proportion of the public storage system or the private storage system may be selected according to properties of the data block to be split (emphasizing security, or emphasizing convenience of accessing and reading the data block). It is better to store a plurality of split data blocks into at least one public storage system and at least one private storage system. Certainly, depending on different requirements of the user (whether the user requires the data block to have higher security or better readability), a portion of a plurality of split data blocks may be stored in the public storage system (they may be respectively stored into a plurality of public storage systems to improve the security of the new data block (the split data block)), while the other new data blocks may be stored in the private storage system (they may be respectively stored into a plurality of private storage systems to improve the security of the new data blocks). The data block to be split (original data block) can be restored only by combining all the split data blocks stored in the public storage system and the private storage system; alternatively, the original data block can also be restored only by combining a portion of the plurality of split data blocks, where this portion (a portion of the plurality of split data blocks) also needs to be simultaneously stored in at least one public storage system and one private storage system. For example, a plurality of the split data blocks may be stored with 30% thereof stored in the public storage system and 70% thereof stored in the private storage system As described above, in the prior art, since the data is stored only through encryption, another person may obtain a decryption password through reverse cracking, so as to acquire the original data to be stored, thereby causing the data to be in an insecure state. However, different from the prior art, with the data block storage method provided by the embodiments of the present invention, the file content of the data block to be stored is split so as to generate at least two pieces of split file content of the data block, where the file content of the data block to be split includes at least one character set, the character set is the smallest unit of the file content that is used for indicating the meaning of the data block to be split, and the character set includes a plurality of characters, and each of the pieces of split file content of the data block includes a portion of the characters of a same character set. That is, the smallest unit for indicating the meaning of the data block is split. In this way, even if another person obtains a portion of the data content after the splitting, it would be not possible to parse effective content. Moreover, by storing the split file content in at least two independent storage systems, the data security is further improved. In addition, by splitting and storing each of the structure coding and the index table of the file header, and by changing the storage proportions of the public storage system to the private storage system, the deficiencies in the prior art are better solved.

Figure 2:
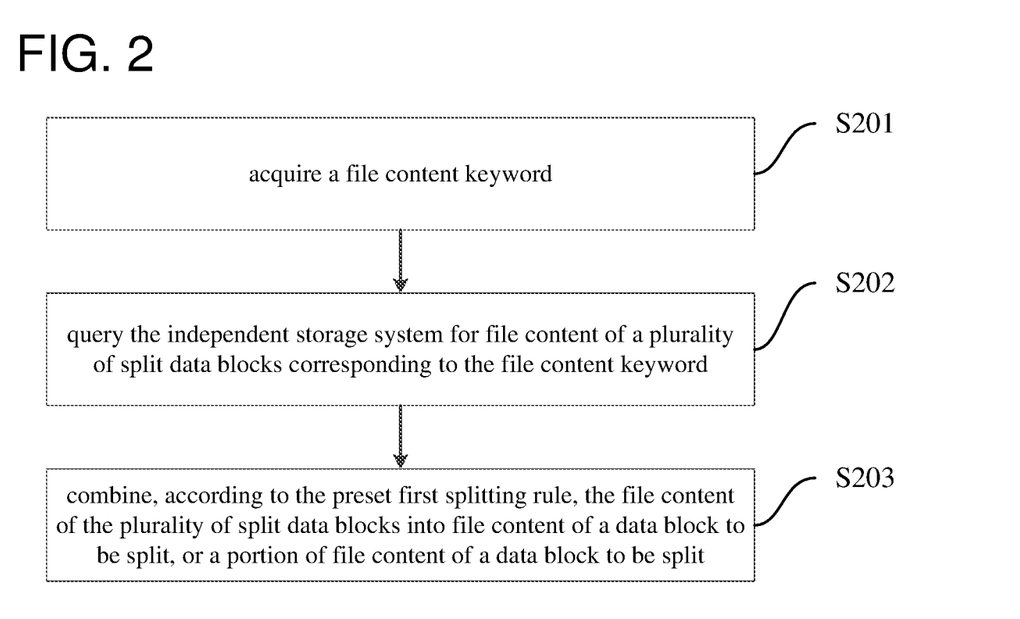
FIG. 2 shows a basic flow chart of a data query method of an embodiment of the present invention.

Embodiment 2 of the present invention provides a data query method, which includes the data block storage method as provided in Embodiment 1. After the split data blocks are stored, the data query method further includes the following steps, as shown in FIG. 2:

S201, acquiring a file content keyword;

S202, querying the independent storage system for file content of a plurality of split data blocks corresponding to the file content keyword; and S203, combining, according to the preset first splitting rule, the file content of the plurality of split data blocks into file content of a data block to be split, or a portion of file content of a data block to be split.

In Step S201, the keyword is one piece of split file content or one split file header, which may be recorded during the process of implementing the data block storage method as provided by the above embodiment. If a terminal obtains a certain character having an indicative function after the splitting, or the split data blocks obtained by the splitting are identified during the splitting, it possible to determine which split data block the keyword corresponds to. Thus, the data block which needs to be queried can be determined.

In Step S202, the splitting of the keyword is performed by splitting the keyword according to the first splitting rule (if the splitting rules for various types of character strings are the same), so as to determine the split data block corresponding to the keyword.

In Step S203, all the acquired split data blocks are restored according to the splitting manner, and the restored data block may be the whole original data block or a portion of the original data block.

Furthermore, the data query method as provided by Embodiment 2 of the present invention further includes: acquiring a file header keyword corresponding to the file content keyword of the split data block;

querying a cloud system for file headers of a plurality of split data blocks including the file header keyword;

combining, according to a preset second splitting rule, the file headers of the plurality of split data blocks into a file header of the data block to be split; and combining the file content of the data block to be split or the portion of the file content of the data block to be split and the file header of the data block to be split into the data block to be split or a portion of the data block to be split.

Furthermore, the file header includes a structure coding indicating a file structure and an index table of the file content, the structure coding is configured to form a framework of the file content, so that the file content can be filled according to the framework, so as to form a file in a form capable of being directly displayed;

the step of combining, according to a preset second splitting rule, the file headers of the plurality of split data blocks into a file header of the data block to be split includes:

acquiring a plurality of zone file structure codings and a plurality of zone file index tables of the plurality of split data blocks; and combining, according to a preset third splitting rule, the plurality of zone file structure codings and the plurality of zone file index tables, respectively, so as to form the file header of the data block to be split.

Furthermore, the data query method as provided by the embodiment of the present invention further includes: acquiring an implicit data code, where the implicit data code is configured to identify an implicit file in the data block;

splitting the implicit data code according to a preset splitting rule for implicit data code, so as to obtain at least two split implicit data codes;

querying a cloud system for file content of a plurality of split data blocks including the implicit data code; and combining, according to the preset first splitting rule, the file content of the split data blocks corresponding to the plurality of split implicit data codes into the file content of the data block to be split or a portion of the file content of the data block to be split.

Embodiment 3 of the present invention provides a data modification method, including the data block storage method of Embodiment 1, where the data modification method further includes:

acquiring a character string to be written, a write position and a write mode, where the write mode includes deletion, addition and replacement;

searching, according to the write position and a first storage position acquired in advance, the independent storage system for a data block to be modified, where the first storage position includes a storage address of the file content of each of split data blocks; and deleting, according to the write position and the first splitting rule, a character corresponding to the write position in the data block to be modified, if the write mode is embodied as deletion, so as to generate file content of the modified data block; or splitting the character string to be written according to the first splitting rule, if the write mode is embodied as addition or replacement, so as to generate a character to be written; and deleting a character corresponding to the write position in the file content of the split data block, and adding, according to the write position, the character to be written to file content of a new data block to be modified, so as to generate file content of a plurality of modified data blocks.

In the above, the modification may be made in such a manner that the modified content are firstly stored independently, and then added to a designated position after the modification is confirmed. The designated position may be between two characters, or between two certain paragraphs, etc.

Obviously, a person skilled in the art should understand that various steps of the present invention as described above may be implemented by a universal computing device, and they can be concentrated on a single computing device or distributed on a network composed by a plurality of computing devices. Optionally, they may be realized by program codes executable by the computing device. Thus, they may be stored in a storage device and executed by the computing device, or they may be respectively made into various integrated circuit modules, or a plurality of modules or steps of them may be implemented in a single integrated circuit module. Thus, the present invention is not limited to any specific modification of hardware and software.

The foregoing are merely preferable embodiments of the present invention, and not intended to limit the present invention. For a person skilled in the art, various modifications and changes may be made to the present invention. Any amendments, equivalent replacements, improvements and so on, made within the spirit and principle of the present invention, should fall within the scope of protection of the present invention.

The invention claimed is:

1. A data block storage method, comprising:
    acquiring a splittable data block, the splittable data block comprising file content indicating actual meaning of the splittable data block, wherein the splittable data block further comprises a file header indicating a file structure of the splittable data block;
    splitting the file content of the splittable data block according to a preset first splitting rule, so as to generate at least two pieces of split file content of the data block, wherein the file content of the splittable data block comprises at least one character set, the character set is a smallest unit of the file content that is used for indicating meaning of the splittable data block, the character set comprises a plurality of characters, and each of the pieces of split file content of the data block comprises a portion of the characters of a same character set; and
    storing, according to a preset first storage position, different ones of the pieces of split file content of the data block into at least two independent storage systems, respectively;
    dividing, according to a preset dividing mode, the splittable data block into a plurality of splittable sub data blocks, so that file content of each of the splittable sub data blocks is exactly identical with a portion of continuous file content of the splittable data block, wherein the step of splitting the file content of the splittable data block according to a preset first splitting rule comprises:
        splitting, according to a data block splitting rule, the file content of each of the splittable sub data blocks, so as to generate a plurality of split data blocks;
    splitting, according to a preset second splitting rule, the file header of the splittable data block so as to generate at least two split file headers of the data block, wherein the file header of the splitable data block comprises at least one character set, the character set is a smallest unit of the file header that is used for indicating the file structure of the splittable data block, and the character set comprises a plurality of characters, each of the split file headers of the data block comprises a portion of the characters of a same character set, or each of the split file headers of the data block comprises a portion of the character sets of the file header of the splittable data block, wherein the step of splitting, according to a preset second splitting rule, the file header of the splitable data block so as to generate file headers of at least two split data blocks comprises:
        acquiring, from the file header, a structure coding indicating the file structure and an index table of the file content, wherein the structure coding is configured to form a framework of the file content, so that the file content can be filled according to the framework, so as to form a file in a form capable of being directly displayed;
        splitting, according to a preset third splitting rule, the structure coding and the index table, respectively, so as to generate a plurality of zone file structure codings and a plurality of zone file index tables corresponding to the individual zone file structure codings, wherein each of the zone file structure codings and each of the zone file index tables both correspond to one of the splittable sub data blocks, and each of the zone file structure codings and the corresponding splittable sub data block is able to be combined into an integral file capable of being directly displayed, and each of the zone file index tables carries file content index information of one designated splittable sub data block; and
        splitting, according to a preset fourth splitting rule, a code of each of the zone file structure codings and a code of each of the zone file index tables respectively, so as to form a plurality of sub zone file structure codings and a plurality of sub zone file index tables, so that each of the sub zone file structure codings is unable to display content of the zone file structure coding corresponding thereto, and that each of the sub zone file index tables is unable to display content of the zone file index table corresponding thereto, and the plurality of sub zone file structure codings and the plurality of sub zone file index tables are respectively carried in at least two of the split file headers of the data block; and
    storing, according to a preset first storage position, different ones of the split file headers of the data block into at least two independent storage systems, respectively.

2. The data block storage method according to claim 1, wherein if the character set of the file content of the splittable data block only comprises character strings with a fixed length, and total number of the characters in the character set of the file content of the splittable data block is able to be exactly divided by Y, where Y is a constant value, the character strings with the fixed length in the file content of the splittable data block are split successively, according to number X of groups and a splitting length Y carried in the first splitting rule, so as to generate X pieces of split file content of the data block, with each of the pieces of split file content of the data block comprising one or more character strings with the length Y.

3. The data block storage method according to claim 2, wherein the splitting, according to number X of groups and a splitting length Y carried in the first splitting rule, the character strings with the fixed length in the character set of the file content comprises:
    splitting, according to a sequential order of arrangement, all the characters of the file content of the splittable data block into a plurality of groups of first character clusters with the length Y; and then successively assigning, according to a sequential order of the first character clusters, the plurality of the first character clusters to the X pieces of split file content of the data block.

4. The data block storage method according to claim 1, wherein if the character set of the file content of the splittable data block only comprises character strings with a fixed length, and total number of the characters in the character set of the file content of the splittable data block is unable to be exactly divided by Y, where Y is a constant value, the character set of the file content of the splittable data block is filled with filling digits, so that the total number of the characters in the filled character set of the file content of the splittable data block is able to be exactly divided by Y; and     the character strings with the fixed length in the file content of the splittable data block is split according to number X of groups and a splitting length Y carried in the first splitting rule, so as to generate X pieces of split file content of the data block, with each of the pieces of split file content of the data block comprising one or more character strings with the length Y.

5. The data block storage method according to claim 1, wherein if the character set of the file content of the splittable data block only comprises character strings with a fixed length, and total number of the characters in the character set of the file content of the splittable data block is unable to be exactly divided by Y, where Y as a splitting length is a variable, all the characters of the file content of the splittable data block are successively split, according to a sequential order of arrangement, into a plurality of groups of second character clusters with a length changing based on Y; and the individual groups of second character clusters are successively assigned to X pieces of split file content of the data block, according to a sequential order of the second character clusters.

6. The data block storage method according to claim 5, wherein the successively splitting the characters of the file content of the splittable data block into a plurality of groups of second character clusters with a length changing based on Y comprises:

continuously splitting, according to one varied value of Y, the characters of the file content of the splittable data block, to obtain X groups of character clusters with a same character length.

7. The data block storage method according to claim 5, wherein the method further comprises:

randomly acquiring a plurality of function values;

performing function operation on each of the function values so as to generate a plurality of values to be used, wherein the function operation comprises trigonometric function operation and exponential and logarithmic function operations; and performing rounding operation on each of the values to be used, so as to determine the variable Y.

8. The data block storage method according to claim 5, wherein if the character set of the file content of the splittable data block further comprises character strings with a varied length, the character strings with the varied length and the character strings with the fixed length in the character set of the file content of the splittable data block are separated into two groups of character strings;

if the total number of the characters in the group of character strings with the fixed length is able to be exactly divided by the splitting length Y, the character strings with the fixed length of the file content of the splittable data block are split according to number X of groups and the splitting length Y carried in the first splitting rule, so as to generate X pieces of split file content of the data block, with each of the pieces of split file content of the data block comprising one or more character strings with the length Y; and a character length of the group of character strings with the varied length is determined, and splitting is performed according to the character length, so as to generate a plurality of groups of split character strings with the varied length, and the plurality of groups of split character strings with the varied length are sequentially assigned to the X pieces of split file content of the data block.

9. The data block storage method according to claim 1, wherein if the splittable data block is in a text format, the combining each of the zone file structure codings and the corresponding splittable sub data block into an integral file capable of being directly displayed, comprises: combining each of the zone file structure codings and the corresponding splittable sub data block into a continuous text segment with a designated number of characters;

if the splittable data block is in a video format, the combining each of the zone file structure codings and the corresponding splittable sub data block into an integral file capable of being directly displayed, comprises: combining each of the zone file structure codings and the corresponding splittable sub data block into a continuous video image with a designated time duration;

if the splittable data block is in an audio format, the combining each of the zone file structure codings and the corresponding splittable sub data block into an integral file capable of being directly displayed, comprises: combining each of the zone file structure codings and the corresponding splittable sub data block into continuous audio data with a designated time duration; or if the splittable data block is in an image format, the combining each of the zone file structure codings and the corresponding splittable sub data block into an integral file capable of being directly displayed, comprises: combining each of the zone file structure codings and the corresponding splittable sub data block into a designated continuous image.

10. The data block storage method according to claim 1, wherein the step of storing, according to a preset first storage position, different ones of the pieces of split file content of the data block into at least two independent storage systems, respectively, comprises:

storing the plurality of pieces of split file content of the data block into different public storage systems and/or private storage systems, according to a predetermined storage proportion.

11. The data block storage method according to claim 1, wherein the step of storing, according to a preset first storage position, different ones of the split file headers of the data block into at least two independent storage systems, respectively, comprises:

storing the plurality of split file headers of the data block into different public storage systems and/or private storage systems, according to a predetermined storage proportion, with storage positions of the split file headers of the data block being different from storage positions of the pieces of split file content of the data block.

12. A data query method, comprising the data block storage method according to claim 1, wherein the data query method further comprises:

acquiring a file content keyword;

querying the independent storage system for file content of a plurality of split data blocks corresponding to the file content keyword; and combining, according to the preset first splitting rule, the file content of the plurality of split data blocks into file content of a splittable data block, or a portion of file content of a splittable data block.

13. The data query method according to claim 12, wherein the method further comprises: acquiring a file header keyword corresponding to the file content keyword of the split data block;

querying a cloud system for file headers of a plurality of split data blocks comprising the file header keyword;

combining, according to a preset second splitting rule, the file headers of the plurality of split data blocks into a file header of the splittable data block; and combining the file content of the splittable data block or the portion of the file content of the splittable data block and the file header of the splittable data block into the splittable data block or a portion of the splittable data block.

14. The data query method according to claim 13, wherein the file header comprises a structure coding indicating a file structure and an index table of the file content, the structure coding is configured to form a framework of the file content, so that the file content can be filled according to the framework, so as to form a file in a form capable of being directly displayed;

the step of combining, according to a preset second splitting rule, the file headers of the plurality of split data blocks into a file header of the splittable data block comprises:

acquiring a plurality of zone file structure codings and a plurality of zone file index tables of the plurality of split data blocks; and combining, according to a preset third splitting rule, the plurality of zone file structure codings and the plurality of zone file index tables, respectively, so as to form the file header of the splittable data block.

15. The data query method according to claim 12, wherein the method further comprises:

acquiring an implicit data code, wherein the implicit data code is configured to identify an implicit file in the data block;

splitting the implicit data code according to a preset splitting rule for implicit data code, so as to obtain at least two split implicit data codes;

querying a cloud system for file content of a plurality of split data blocks comprising the implicit data code; and combining, according to the preset first splitting rule, the file content of the split data blocks corresponding to the plurality of split implicit data codes into the file content of the splittable data block or a portion of the file content of the splittable data block.

16. A data modification method, comprising the data block storage method according to claim 1, wherein the data modification method further comprises:

acquiring a character string to be written, a write position and a write mode, wherein the write mode comprises deletion, addition and replacement;

searching, according to the write position and a first storage position acquired in advance, the independent storage system for a data block to be modified, wherein the first storage position comprises a storage address of the file content of each of split data blocks; and deleting, according to the write position and the first splitting rule, a character corresponding to the write position in the data block to be modified, if the write mode is embodied as deletion, so as to generate file content of the modified data block; or splitting the character string to be written according to the first splitting rule, if the write mode is embodied as addition or replacement, so as to generate a character to be written; and deleting a character corresponding to the write position in the file content of the split data block, and adding, according to the write position, the character to be written to file content of a new data block to be modified, so as to generate file content of a plurality of modified data blocks.

* * * * *